APPLICANT
Michael Henry Moscardi
BY
Misegades & Douglas
ATTORNEYS

United States Patent Office
3,445,742
Patented May 20, 1969

3,445,742
CONTROL CIRCUITS FOR INVERTERS PRODUCING AN ALTERNATING OUTPUT CONSTITUTED BY A PULSE TRAIN
Michael Henry Moscardi, Stafford, England, assignor to The English Electric Company Limited, London, England, a British company
Filed July 11, 1966, Ser. No. 564,415
Claims priority, application Great Britain, July 9, 1965, 29,328/65
Int. Cl. H02p 1/42, 3/18, 5/26
U.S. Cl. 318—230                              7 Claims

ABSTRACT OF THE DISCLOSURE

This invention relates to a control circuit for an inverter producing an alternating output constituted by a pulse train and includes an integrator connected to receive this output, a comparator for comparing the integrated output signal with a reference signal having the same waveform and frequency as that desired from the output, and a trigger circuit adapted to switch successively from one state to another in response to the difference signal developed by said comparator successively attaining a predetermined positive and negative magnitude. The output from the trigger circuit is therefore constituted by pulses having a variable repetition frequency, and these pulses are differentiated and fed back as firing pulses to the appropriate thyristors in the invertor to govern the repetition rate and/or widths of the train of pulses produced thereby so as to cause these pulses to manifest the desired output.

---

This invention relates to inverter control circuits, and particularly, but not necessarily exclusively, relates to control circuits for thyristor inverters employed, for example, in variable frequency induction motor drives, in which application it is necessary to increase and decrease the applied voltage in response to corresponding changes in the frequency in order to maintain the correct flux density in the motor.

From one aspect, the invention consists in a control circuit for an inverter which is adapted to produce an alternating output constituted by a train of pulses, comprising means connected to the output of the inverter for producing from said pulses an output signal bearing a predetermined relationship thereto, a comparison circuit for comparing said signal with a reference signal representative of the output desired from said inverter, and a control device responsive to the magnitude of the difference between said output and reference signals for governing the repetition rate and/or widths of the pulses produced by the inverter in such a manner as to reduce the magnitude of said difference and thereby to cause the pulses to manifest the output desired.

Preferably, the control device includes a trigger circuit having upper and lower triggering levels which govern the limits within which the magnitude of the difference between said output and reference signals may depart from a predetermined mean value.

The means for producing the output signal may conveniently comprise an integrator, or the integration may be performed by a motor driven by the inverter. The inverter itself may include a plurality of thyristors which are fired by the control means and connected to a constant D.C. supply. With the inverter operated from a constant D.C. supply, the train of pulses have a fixed magnitude but the resultant alternating voltage yielded therefrom has a mean magnitude which reduces with a reduction in frequency, the pulses in the train being modulated in width at the lower frequencies and having a constant width, e.g. a substantially square waveform, at the highest frequencies.

A circuit according to this invention thus affords a convenient way of producing an alternating voltage from a fixed direct voltage, the alternating voltage produced yielding a good current waveform over a wide frequency range and having a magnitude which increases with increasing frequency.

These characteristics are achieved without excessive switching rates since switching is only effected when the difference or "error" signal excursions attain certain limiting values determined by the trigger circuit.

Figure 1:
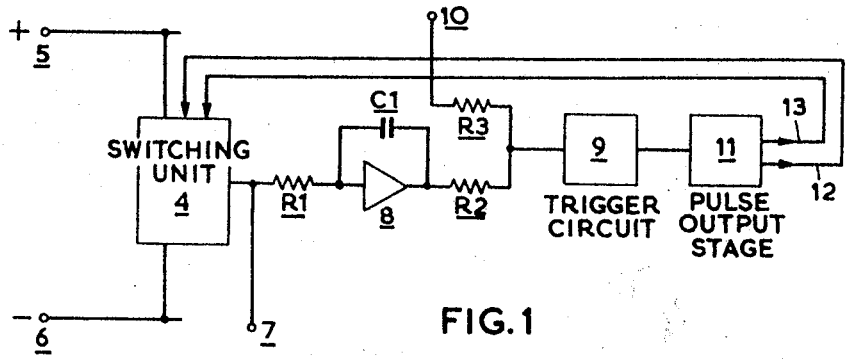
Figure 3:
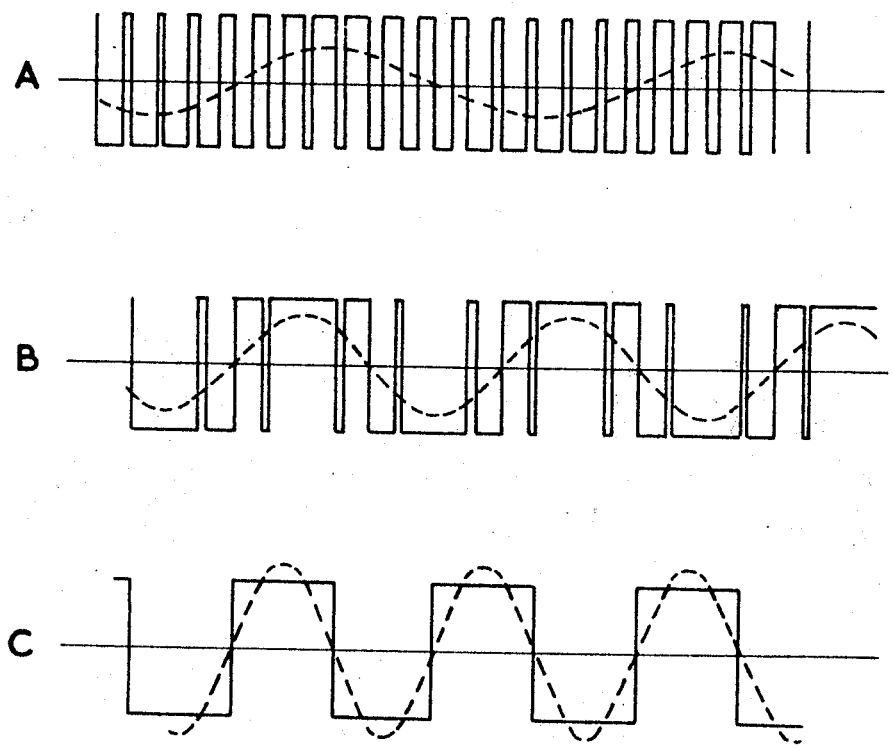
Figure 5:
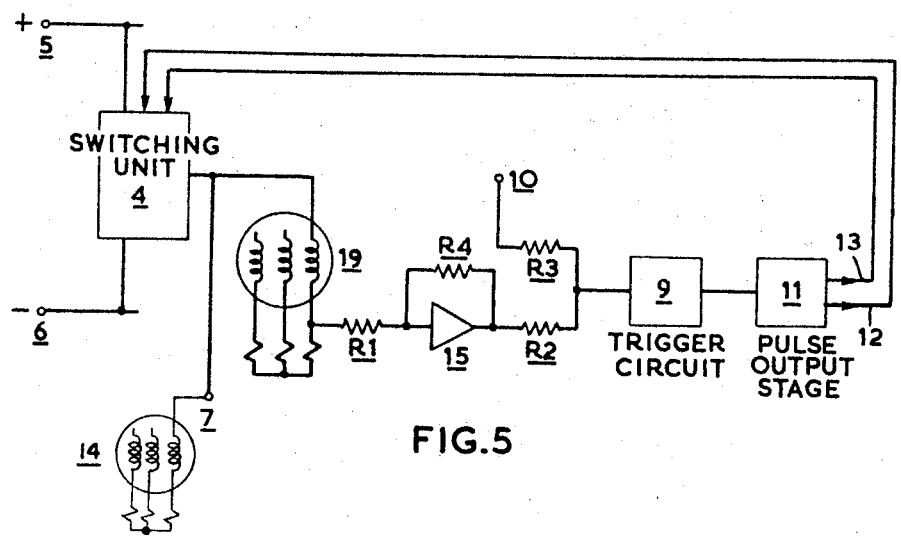
Figure 4:
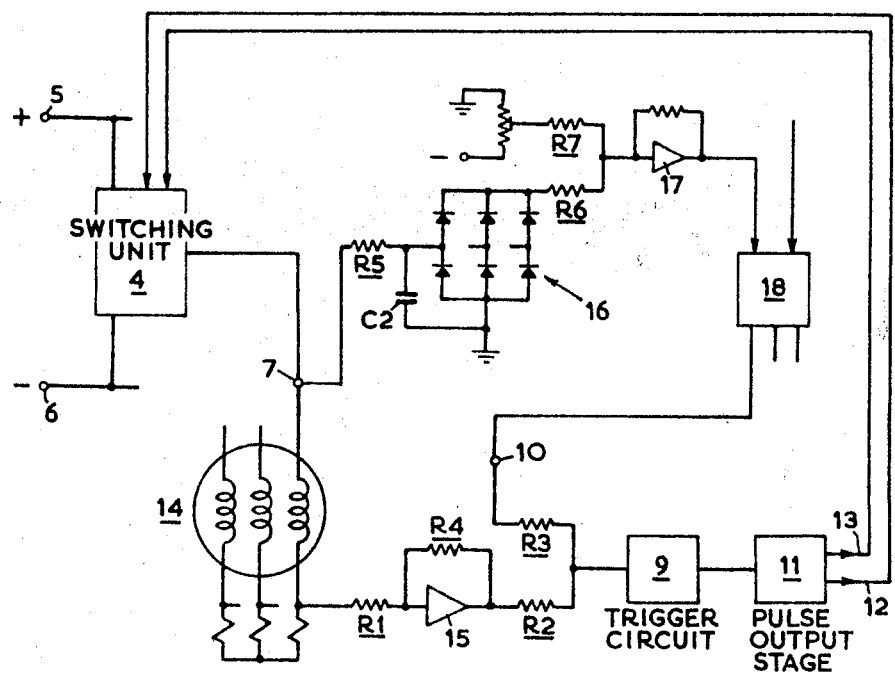

In order that the invention may be fully understood, some embodiments thereof will now be described, by way of example, with reference to the accompanying drawings, in which:

FIGURE 1 is a circuit diagram of one form of control circuit according to this invention;
FIGURES 2A to 2E illustrate waveforms obtained at various positions in the circuit shown in FIGURE 1;
FIGURES 3A to 3C illustrate output waveforms obtained with the circuit shown in FIGURE 1 under various conditions of operation; and
FIGURES 4 and 5 are circuit diagrams of other forms of control circuit according to this invention.

Referring now to FIGURE 1, a single-phase invertor switching unit 4 is connected across terminals 5 and 6 of a D.C. supply, and the A.C. output of this unit appears at terminal 7.

This unit is of the same type as that described in our Patent No. 3,250,978 and basically comprises a symmetrical circuit arrangement of two thyristors, two diodes and a capacitor-reactor circuit operable to provide the energy for switching-off the appropriate thyristor. In particular, in one arrangement, the two thyristors are connected across the positive and negative terminals of the D.C. supply in series with a centre-tapped reactor connected between the anode and cathode of the two thyristors. The output terminal 7 is connected to the centre-tap and a diode and capacitor are each connected between the centre tap and the positive and negative terminals, respectively, of the D.C. supply. In effect, this unit can conveniently be considered as a single-pole two-way switch which connects the output terminal 7 to either the positive terminal 5 or the negative terminal 6 of the D.C. supply.

The output from this inverter unit is connected to an induction motor (not shown) and is additionally fed to an integrator 8 which consists of a conventional operational amplifier bridged by a capacitor C1 and having an input resistor R1. The integrated output is fed through a resistor R2 to the input of a trigger circuit 9, e.g. a bistable multivibrator, together with a reference signal from terminal 10 which is applied to the trigger circuit through a resistor R3.

The resultant input signal to the trigger circuit is therefore constituted by the difference between the integrated and reference signal and this circuit triggers from one state to another when this difference signal exceeds a predetermined magnitude. In particular, the trigger circuit 9 is designed to have a preset amount of electrical "backlash," that is, it will trigger from one to its other state upon receiving an input signal which attains a predetermined value in one sense, e.g. positive-going, and will trigger from its other back to its one state upon receiving a signal which attains a predetermined value in the opposite sense, e.g. negative-going. The output from the trigger circuit is thus a series of rectangular pulses having widths which are determined by the periods which elapse between the input (difference) signal successively attaining the "upper" and "lower" trip levels at which the trigger circuit switches.

These output pulses are applied to an output stage 11 which includes differentiating circuits so connected as to produce positive-going pulses on an output lead 12, connected to the gate electrode of one of the thyristors in the unit 4, upon a positive-going transition of the output pulses from trigger circuit 9, and to produce positive-going pulses on an output lead 13, connected to the gate electrode of the other thyristor, upon a negative-going transition of these output pulses.

The manner of operation of the circuit will now be more particularly described with reference to the waveforms shown in FIGURES 2A to 2E.

It will be assumed that the alternating output required at terminal 7 is sinusoidal, and that accordingly the reference signal (FIGURE 2A) applied to terminal 10 is a sine wave having a frequency the same as that of the alternating output signal desired and a magnitude proportional to this latter signal.

Figure 2:
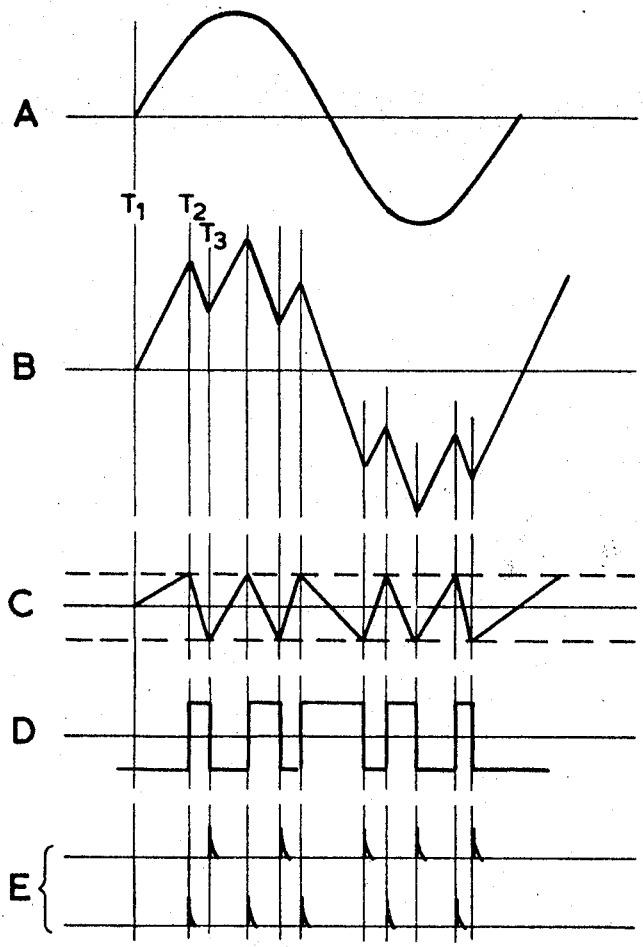

Considering firstly the reference voltage rising from zero magnitude (instant T1) and the unit 4 giving a positive output, the integrator 8 will produce a steadily increasing positive-going output (FIGURE 2b). This output is increasing at a faster rate than the reference voltage and the difference (error) voltage (FIGURE 2C) applied to the trigger circuit 9 accordingly rises until it attains the upper trip level thereof at instant T2. The trigger circuit thus switches and produces a rising voltage front (FIGURE 2D) which is differentiated in the output stage 11 and applied as a sharp firing pulse (FIGURE 2E) to the gate electrode of that thyristor in unit 4 connected to give a negative output.

The output of the integrator 8 than steadily decreases and causes the difference voltage applied to the trigger circuit initially to decrease to zero and then increase negatively until it attains the lower trip level of the trigger circuit at instant T3. At this instant, the trigger circuit again switches, producing a falling voltage which is differentiated and inverted in the output stage 11 and applied as a sharp firing pulse to the gate electrode of that thyristor in the unit 4 connected to give a positive output.

The output of the integrator then steadily increases again and the sequence of events is continued, the output of the inverter being switched positively and negatively in succession as the difference voltage applied to the trigger circuit successively attains the lower and upper trip levels thereof.

The output developed at terminal 7 during this sequence of operation will have a waveform which is the inverse of the trigger circuit output (FIGURE 2D), which yields an alternating signal of the same frequency as the reference.

Clearly, the higher the frequency, the more closely does the output at terminal 7 approach a square wave and the less are the number of switchings per cycle. This is illustrated more clearly in FIGURES 3A to 3C, in which FIGURE 3A shows the output obtained with the circuit operative in the pulse width modulation mode, the low frequency sinusoidal signal yielded being superimposed on the pulses, FIGURE 3C shows the output obtained with the circuit operative in the square wave mode, yielding a higher frequency sinusoidal signal, and FIGURE 3B shows the output obtained with the circuit operative in a transitional mode between pulse width modulation and square wave. It can readily be observed from these latter figures that the higher the frequency, the larger is the alternating voltage yielded, which satisfies the requirements for maintaining the correct flux density in an induction motor driven by this output.

Although the system has been described with reference to single phase operation, it can readily be adapted for multiphase operation by connecting a number of the above circuits, corresponding to the number of phases, to the D.C. supply, the reference voltage being phase displaced by the appropriate amount.

An alternative circuit for multi-phase operation is shown in FIGURE 4 in which, instead of the integration being performed by the integrator circuit 8, it is now performed by the inductance possessed by the three-phase motor 14 driven by the output from terminal 7, the current taken by this motor being converted into a voltage by shunt resistors and amplified in an amplifier 15 having a feedback resistor R4. The remainder of the control circuit operates in the same manner as that described with reference to FIGURE 1 but in order to compensate for variations in the loading of the motor and additional control loop in utilised to vary the amplitude of the reference signal.

More particularly, the terminal voltage of the motor is fed through a network consisting of a resistor R5 and a capacitor C2 which has a voltage-frequency characteristic which is the inverse of the voltage-frequency characteristics of the motor, that is, whereas the terminal voltage of the motor is arranged to increase, substantially linearly, with increasing frequency under constant load conditions, the voltage developed across the capacitor C2 decreases, in a similar manner, with this increase in frequency. Thus, if the terminal voltage of the motor is correct, then, regardless of the frequency of the motor, the voltage across capacitor C2 will be constant.

This voltage across the capacitor is rectified by a three-phase bridge rectifier 16 and applied through a resistor R6 to the input of an amplifier 17. A negative D.C. reference voltage is also applied to this amplifier through a resistor R7 so that the net voltage amplified is the difference voltage received at its input, and this "error" signal is employed to control the amplitude of the reference frequency signal applied to a reference waveform generator 18 in such a manner as to maintain the correct voltage input to the trigger circuit 9 irrespective of any variations in the loading of the motor 14.

One advantage of this circuit is that a limit to the instantaneous current value which may be achieved may be readily set by imposing a limit on the amplitude of the reference waveform which can be developed at terminal 10 and accordingly the output current from the invertor switching unit 4 can be prevented from exceeding a predetermined value. This feature can be particularly valuable in practice since any forced commutation circuit has an upper limit to the current which can be handled, that is, a limit beyond which the thyristors cannot be turned-off.

Another alternative circuit is shown in FIGURE 5, in which a small induction motor 19, running light, has been introduced to perform the integration instead of the main driven motor, this small motor having similar characteristics to the driven motor. Again, this motor can be considered as operating in exactly the same manner as the integrator 8 in FIGURE 1 except that the integration is performed this time by the small motor's inductance, the current taken by the motor being converted into a voltage by shunt resistors and amplified in an amplifier 15, as in the FIGURE 4 embodiment.

Alternatively, the motor 19 may conveniently be replaced by a static circuit equivalent to that of the motor, i.e. a circuit which possesses the same effective reactance and resistance as the motor.

I claim:

1. A control circuit for an inverter which is adapted to produce an alternating output constituted by a train of pulses, comprising means connected to the output of the inverter for producing from said pulses an output signal bearing a predetermined relationship thereto, a reference signal source for producing a reference signal representative of the output desired from said inverter, a comparison circuit for comparing said output and reference signals and producing a difference signal therefrom, a bistable trigger circuit responsive to said difference signal and having upper and lower triggering levels at which it switches in response to the difference signal attaining a predetermined magnitude first in one sense and then in the other, and a differentiating circuit connected between the trigger circuit and the inverter for differentiating the output from said trigger circuit and producing first and second output pulses upon the trigger circuit attaining its upper level and attaining its lower level, respectively, the first output pulses being operable to cause the inverter to effect a voltage transition in one sense and the second output pulses being operable to cause the inverter to effect a voltage transition in the opposite sense whereby the inverter is governed to reduce the magnitude of the difference signal and thereby cause the train of pulses to manifest the said desired output.

2. A control circuit according to claim 1, wherein said means producing the output signal includes
an integrating amplifier for integrating the output pulses.

3. A control circuit according to claim 1, in which the output of the inverter is connected to drive a motor, the motor having windings which have such an inductance as to integrate the output pulses, and wherein said means producing the output signal includes
an amplifier for amplifying the integrated pulses.

4. A control circuit according to claim 3, comprising control means for developing a voltage proportional to any difference between the actual and desired voltages across the motor under operating conditions,
a reference voltage source,
a further comparison circuit for comparing said voltage with the reference voltage source, and
means for modifying the magnitude of the said reference signal in dependence on the output from said further comparison circuit in such a manner as to reduce the difference between the actual and desired voltages across the motor towards zero.

5. A control circuit according to claim 1, in which the output of the inverter is connected to drive a motor, the said means producing the output signal including
a further motor which is of the same type as the driven motor, the further motor having windings which have such an inductance as to integrate the output pulses.

6. A control circuit for an inverter which is adapted to produce an alternating output constituted by a train of pulses, comprising
a motor connected to receive the output pulses from said inverter,
means for producing from said pulses an output signal bearing a predetermined relationship thereto,
a resistor-capacitor network connected to said motor for developing a voltage proportional to any difference between the actual and desired voltages across said motor,
a first reference source of voltage,
a first comparison circuit for comparing the said developed voltage with the reference voltage,
a second reference source of voltage representative of the output desired from said inverter,
first control means for modifying the magnitude of the voltage from said second reference source in dependence on the output from said first comparison circuit,
a second comparison circuit for comparing the modified reference voltage with the said output signal, and
second control means connected between the inverter and the second comparison circuit and responsive to the output therefrom to govern the widths of the pulses produced by the inverter in such a manner as to reduce the output from the second comparison circuit towards zero.

7. A control circuit according ot claim 6, wherein said resistor-capacitor network has a voltage-frequency characteristic which is the inverse of the voltage-frequency characteristic of the said motor.

References Cited

UNITED STATES PATENTS

| | | | |
|---|---|---|---|
| 3,131,340 | 4/1964 | Johnson et al. | 318—20.480 XR |
| 3,250,978 | 5/1966 | Moscardi | 318—345 |
| 3,260,912 | 7/1966 | Gregory | 318—341 |
| 3,308,307 | 3/1967 | Moritz | 318—20.480 XR |
| 3,309,592 | 3/1967 | Fayre | 318—341 XR |
| 3,354,371 | 11/1967 | Ainsworth et al. | 318—341 |
| 3,376,490 | 4/1968 | Osugi | 321—5 |

ORIS L. RADER, *Primary Examiner.*

G. Z. RUBINSON, *Assistant Examiner.*

U.S. Cl. X.R.

318—18, 341; 321—5